March 5, 1974   W. O. SASSAMAN   3,795,722

METHOD OF MAKING A SKIN COVERED FOAM ARTICLE AND SAID ARTICLE

Filed Oct. 2, 1970

INVENTOR.
WILLIAM O. SASSAMAN
BY
*J. D. Wolf*
ATTORNEY

United States Patent Office

3,795,722
Patented Mar. 5, 1974

3,795,722
METHOD OF MAKING A SKIN COVERED FOAM ARTICLE AND SAID ARTICLE
William O. Sassaman, Akron, Ohio, assignor to The Goodyear Tire & Rubber Company, Akron, Ohio
Filed Oct. 2, 1970, Ser. No. 77,494
Int. Cl. B29d 27/04
U.S. Cl. 264—45          3 Claims

ABSTRACT OF THE DISCLOSURE

A cellular article having a unitary skin thereon devoid of seam lines and a method of making said article.

---

This invention relates to a method of forming an integral padded element formed by seaming an outer shell over a resilient foam core. More particularly, this invention relates to the production of skin covered foam elements or articles to facilitate obtaining the proper seaming between the skin pieces.

The use of skin-covered foam articles is extensive in automobile and related industries in interior decorative elements such as sun visors, door panels, arm rest, seat cushions, seat backs, etc. Also, the use of skin covered foam article in furniture pieces and even bathroom seats presents a problem in obtaining the proper sealing between the various skin parts to obtain a satisfactory appearing article, with the desired service life. Therefore, an object of this invention is to provide a method of making articles of this type and to obtain satisfactory seam closure between the various skin elements without the necessity of resorting to special and costly seaming techniques, such as sewing, heat sealing, cementing, etc.

Figure 1:
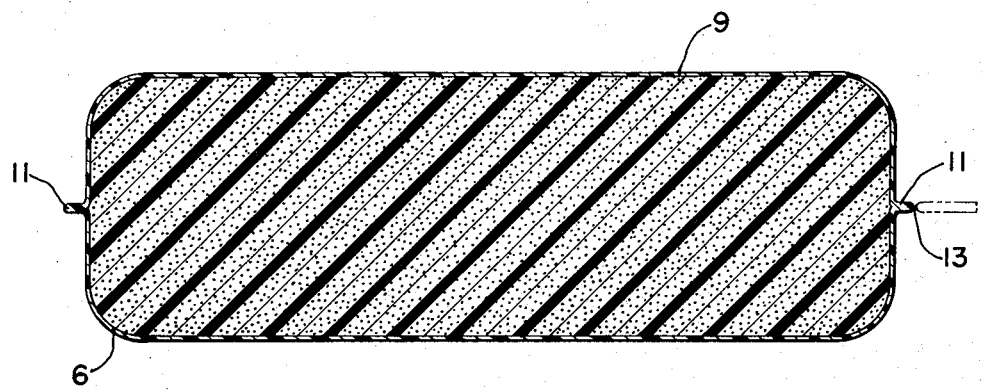
Figure 2:
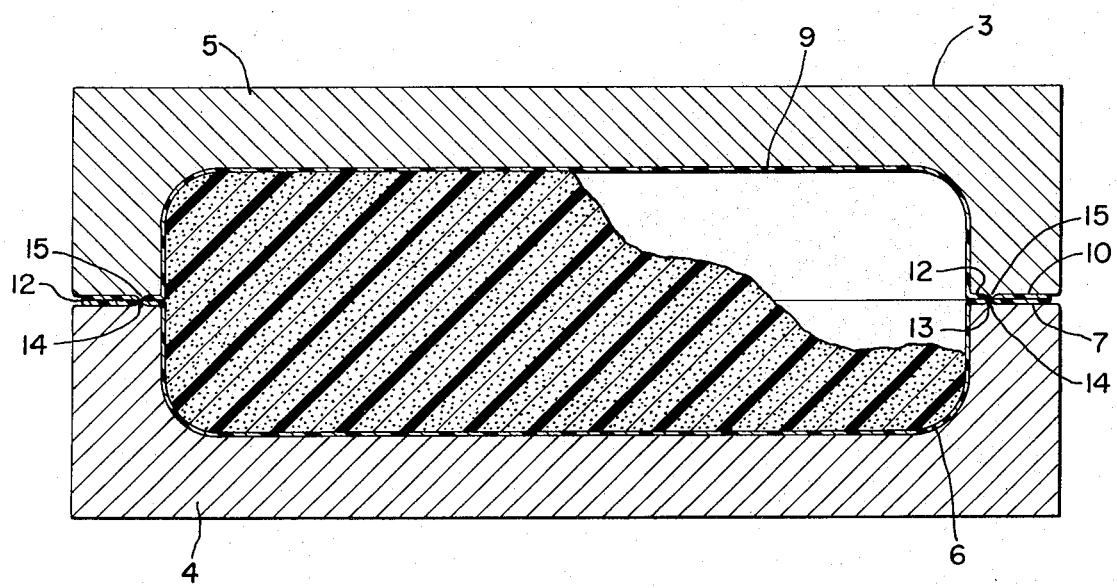

The nature of this object, its advantages and other features may be more readily apparent by reference to the accompanying drawings wherein FIG. 1 is a cross sectional view through a skin covered foamed seat made in accordance with this invention; and FIG. 2 is a cross section through a mold illustrating the method of obtaining seam closure.

Referring specifically to FIG. 2, numeral 3 designates generally a 2-piece mold with the lower part of the mold 4 having resting thereon the upper part or lid 5. The lower part of the mold had resting or positioned therein a homogeneous polyurethane 6 which extends over the surface of the cavity of the mold and onto the lip 7.

Likewise, the upper part or lid 5 of the mold has a homogeneous polyurethane 9 positioned against the surface of the cavity and extending out over the lip 10 of the lid 5 in the manner shown. With the homogeneous polyurethane or skin resting against the surface of the cavity of the mold, the cavity has placed therein a suitable foamable mixture which is caused to foam and fill the mold when the lid is closed to the position shown in FIG. 2. With the lid closed in the position shown in FIG. 2 the foamable material will fill the cavity of the mold with foam and when the reaction is fully completed will result in a foamed article as shown in FIG. 1, after the excess homogeneous polyurethane has been trimmed away to leave seam 11.

It should be noted that just prior to or immediately before closing the mold at least the lip areas designated by numeral 12 of the homogeneous polyurethane is coated with a liquid polyurethane reaction mixture or an organic isocyanate or polyisocyanate. Thus the pressure placed on the lid during the foaming action while the lid is locked in closed position results in the homogeneous polyurethane layers 6 and 9 in the lip area being integrated together to give an integral skin in the seam area. Thus, when the mold is open and the resulting foamed article is removed from the mold and the excess homogeneous polyurethane in the lip area trimmed away it yields a finished article having the appearance shown in FIG. 1.

Preferably the mold is designated to yield a pinch or nicked area 13 in the homogeneous plastic in the lip area 12. This is best achieved by designing the mold to have projections 14 and 15 shown in FIG. 2. This decrease in thickness of the sprue in the area 12 facilitates removing the excess homogeneous polyurethane and thereby obtaining an article of the type shown in FIG. 1.

The homogeneous polyurethane is preferably formed by spray coating the surface of the mold with a polyurethane reaction mixture such as a mixture of a reactive hydrogen containing material, an organic polyisocyanate and a curative. It should be appreciated that the mixing of the organic polyisocyanate and the curative with the reactive hydrogen containing material may be either by the prepolymer method or the 1-shot method or even the pseudo-prepolymer method.

Alternately, the skin may be formed by any of the normal techniques such as rotational or slosh molding wherein the mold halves 4 and 5 with a cover are rotated while containing a suitable catalyzed material until it gels so that a urethane coating or skin is formed on the mold surface.

A polyurethane reaction mixture suitable for preparing the skin or homogeneous plastic comprises (1) a reactive hydrogen containing material having a molecular weight of at least about 500 and no more than about 6000, (2) an organic polyisocyanate, preferably one having all the isocyanate groups attached to nonbenzenoid carbon atoms, (3) a crosslinker, preferably a nonaromatic primary diamine, said polyisocyanate and said diamine being so selected that the reaction between them in boiling methylene chloride of 0.2 to 0.5 molar concentration causes a turbidity inside of 30 seconds. For these polyurethane reaction mixtures to be spreadable, it is desirable that they contain a suitable inert solvent. These spreadable polyurethane reaction mixtures can be brushed, dipped, sprayed or otherwise applied to the surface of the multiple-piece mold to form the skin. Where the organic polyisocyanate is of the type having no isocyanato groups attached to nonbenzenoid carbon atoms and the primary diamine is nonaromatic, the skin will offer unusual resistance to discoloration.

Where fast dry or curing of skin is not a problem, then the lower polyols such as the glycols of ethylene, propylene or butylene or triols such as trimethylol propane or ethane can be used. Also, the aromatic diamines can be used where discoloration is not a problem.

The spreadability of these polyurethane reaction mixtures is best assured where the reaction mixture comprises (1) a reactive hydrogen containing material having a molecular weight of about 900 to 3000, (2) an organic polyisocyanate preferably of the nonaromatic type, (3) a primary diamine preferably of the nonaromatic type, and (4) sufficient inert solvent to render the mixture spreadable.

Preferred results are obtained when the reactive hydrogen containing material is first reacted with an organic polyisocyanate having all the isocyanate groups attached to nonbenzenoid carbon atoms and then the nonaromatic primary diamine is added to the resulting reaction product. Since the nonaromatic organic polyisocyanates and nonaromatic primary diamines utilized develop a turbidity according to the Muller hot methylene chloride test described in U.S. 2,620,516, it has been discovered that a particularly useful technique for improving and for prolonging the spreadability of the polyurethane reaction mixture is to heat the organic diamine with a ketone selected from the class consisting of acetone and methyl ethyl ketone. Thus, these ketones may be utilized as a part or all of the solvent in making polyurethane reaction mixtures which remain spreadable for a longer time.

The reactive hydrogen containing materials useful in this invention have a molecular weight of at least about 500 and no more than about 6000. Where elastomeric materials are desired, the molecular weight should be about 1000 and preferably no higher than about 3000.

Representative classes of reactive hydrogen containing materials are the polyester polyols, polyether polyols, polyether-polyester polyols, polyester amides, castor oil, polycarbonate polyols and polydiene polyols and the hydrogenated polydiene polyols.

Representative examples of these reactive hydrogen containing materials are the alkylene carboxylates diols where the alkylene radical is ethylene, propylene, butylene, amylene and hexylene or mixtures thereof and the carboxylates are those of the dibasic acids of 2 to 10 carbon atoms such as adipic acid. The corresponding alkylene azelates are desired where low temperature properties are required. The (polyalkylene ether) glycols or triols are preferred where the alkylene radical is propylene and butylene.

Although any organic polyisocyanates can be used the preferred ones are the nonbenzenoid type.

Representative of the organic polyisocyanates having all the isocyanate groups attached to nonbenzenoid carbon atoms which are useful in this invention are m-xylene diisocyanate,
4,4'-methylene bis(cyclohexyl isocyanate),
p-methane diisocyanate,
bis(2-isocyanatoethyl) fumarate,
bis(2-isocyanatoethyl) carbonate,
bis(2-isocyanatoethyl)-4-cyclohexene-1,2-dicarboxylate
  and hexamethylene diisocyanate,
1-methyl cyclohexyl-2,4-diisocyanate,
1-methyl cyclohexyl-2,6-diisocyanate and mixtures of
1-methyl-cyclohexyl-2,4-diisocyanated and
1-methyl cyclohexyl-2,6-diisocyanate.

Representative of the nonaromatic primary diamines are 1,4-cyclohexane bis(methylamine),
p-methane diamine,
1,6-hexamethylene diamine,
trans-1,2-cyclobutane bis(methylamine),
1-methyl cyclohexyl-2,4-diamine,
diamino cyclopentane and ethylene diamine.

Although the polyurethane reaction mixtures may be made by simultaneously mixing the reactive hydrogen containing material, the organic polyisocyanate and the diamine, it is preferred that the reactive hydrogen containing material and the organic polyisocyanate be first reacted to give a prepolymer and then the diamine be added. Also, it has been observed that about 1.3 to 3 moles of organic polyisocyanate may be used for each mol of reactive hydrogen containing material although slightly lower and higher ratios may be utilized but it has been observed that the resulting physical properties of the cured product are not as satisfactory as those obtained at the above ratios. The amount of diamines used should be about .5 to 1 mole for each mole of free isocyanate present. This is especially true where the final cure and shaping of the reaction mixture is to be carried out at room temperature although it has been found that .7 to about 1.2 moles of diamine for each mole of free isocyanate may be utilized and it should be appreciated that the use of catalysts such as the well-known organic tin catalyst will affect the ratio and ultimate physical properties obtained where the reaction is carried out at room temperature or at temperatures up to about 150° C. It should be emphasized that the use of catalysts such as the organic tin catalysts have a tendency to effect the aging properties of the resulting polyurethane. Other catalysts such as the well-known tertiary amines may be utilized.

The polyurethane reaction mixtures useful preparing the skins preferably are essentially nondiscoloring after exposure for a hundred hours in a weatherometer. Thus, especially valuable results are obtained when the polyurethane reaction mixture contains various pigments, usually in the ratio of about 5 to 100 parts per hundred parts of said reaction mixture. Normally, about 5 to 20 parts of pigment will be sufficient to give the desired aesthetic effect. It should be emphasized that the well-known inorganic pigments such as titanium oxide, lead sulfate, chrome yellows, rouge and other pigments of the inorganic type may be utilized in this invention. Similarly, the organic pigments such as the resorcinol greens, indigo, turkey red, triphenyl methane dyes, xanthene dyes, the stilbene and other dyes such as those listed in William T. Caldwell's book on organic chemistry, copyrighted in 1943, Riverside Press, starting at page 702 through page 725 may be used, too.

Illustrative of this invention are the following examples where all parts are by weight unless otherwise indicated:

EXAMPLE I

A decorative skin was formed by spraying a polyurethane reaction mixture of the nature shown in Example II onto an embossed mold and cured. This skin had the physical contour of that shown in FIG. 2. A foamable polyurethane mixture was added thereto in an amount sufficient to fill the cavity of the skin when the foaming was complete. This foamable mixture comprised a mixture of polypropylene ether glycol and polypropylene ether triol, toluene diisocyanate, a small amount of water and dichlorofluoroethane and catalyst N-ethyl morpholine and triethylene diamine. The skin in the lip area was painted with the mixture used to form the skin immediately prior to adding the foamable polyurethane mixture and closing the lid. The foamable reaction mixture was allowed to foam and fill the mold, to adhere the skin to the foam. Thus, when the lid was open after the polyurethane foam had been cured, a seat cushion having the decorative and design features embossed in the mold was obtained after the excess skin was cut away to leave the seam as shown in FIG. 1.

EXAMPLE II

A prepolymer was prepared from 8000 parts of 80 ethylene 20 propylene adipate having a reactive number of 62 and 2352 parts of 4,4'-diisocyanatodicyclohexyl methane in the following manner:

The polyester was degassed under vacuum at 76–100° C. for one hour. The molten diisocyanate (mixture of cis and trans forms) was then added and allowed to react at 90–114° C. for one hour. Vacuum was then applied slowly (to prevent vigorous frothing) over a period of one hour. The prepolymer then showed 3.5 percent isocyanate content.

The prepolymer was diluted as follows:

|  | Parts |
|---|---|
| Prepolymer | 100 |
| Methyl ethyl ketone | 30 |
| Toluene | 30 |
| Cellulose acetate butyrate solution (10% in Cellosolve acetate) | 5 |
|  | 165 |

The diluted prepolymer showed 2.0 percent isocyanate content (percent NCO). The diluted prepolymers are hereinafter referred to as Component A.

To 40 parts of Component A was added 15 parts of p-xylene. A curative solution A was prepared by heating 1.5 parts 1,4-cyclohexane-bis (methylamine), 2 parts N,N'-dimethylformamide and 3 parts methyl ethyl ketone. The curative solution was added to the diluted prepolymer and used to coat the surface of a multiple-piece mold to buildup a skin 5 to 25 mils thick.

EXAMPLE III

Fifty (50) parts of a clear diluted prepolymer prepared according to the procedure of Example II, was treated with a solution of 1.0 part trans-cyclobutane-1,2-bis-(methylamine) in 10 parts of methyl ethyl ketone. There was ample pot life to coat by brushing or spray coating a two-piece mold for a car seat back to buildup a skin 10–15 mils thick on the lid and cavity portion.

EXAMPLE IV

A prepolymer was made by reacting 500 parts of polytetramethylene ether glycol of about 1340 molecular weight with 204 parts of 4,4'-diisocyanato dicyclohexyl methane until the resulting product had isocyanate analysis of 4.5 percent.

A solution of the above prepolymer was made by dissolving 100 parts of the prepolymer in a mixture of 20 parts toluene and 20 parts methyl ethyl ketone.

This solution of prepolymer (50 parts) was mixed with 11.5 parts of a curative and used to brush coat a seat cushion mold to give a decorative skin thereon. This solution was used to wet the skin in the seam area prior to closing the mold after addition of the foaming mixture.

The curative used was prepared by heating a mixture of 20 parts of 1,4-cyclohexane-bis(methylamine) and 80 parts of methyl ethyl ketone at 160° F. for 10 minutes. If the curative is not heated the pot life or work time is very short and a two-component spray system should be used, but if the curative is heated with the methyl ethyl ketone, then the pot life is about 8 minutes.

EXAMPLE V

A curative was prepared by heating a mixture of 40 parts of anhydrous 1,6-hexylene diamine and 160 parts of methyl ethyl ketone under reflux condenser for 20 to 30 minutes at 65° C.

This curative (7 parts) was mixed with 50 parts of the diluted prepolymer of Example I and then used to buildup a skin in a mold. The skins were tack free on standing at about 20° C. for 25 minutes. The skin was clear and showed negligible discoloration after exposure in a weatherometer for 100 hours. The cured polyurethane had a tensile of 3580 pounds per square inch and a 660 percent elongation.

Other diamines such as those having 3 to 20 carbon atoms may be used instead of the diamines mentioned above, but it should be borne in mind that some of the lower diamines, i.e. those of 4 and 5 carbon atoms, have distateful odors and the aromatic ones produce a skin that discolors.

Other inert solvents than the hydrocarbons boiling below about 260° C. may be used, for example, the other solvents normally used in making paints such as nitropropane, ethyl formate, alkyl formate, alkyl acetate, ethyl acetate, ketones other than those previously listed, and the chlorinated hydrocarbons boiling below about 260° C. Usually the solvent is used in as little as 5 to 20 parts to as much as 70 to 100 parts per hundred parts of prepolymer.

EXAMPLE VI

A hydrogenated polybutadiene polyol of about 3400 molecular weight (17.1 parts) was dissolved in 15 parts of p-xylene and then 2.9 parts of 4,4'-methylene-bis-(cyclohexyl isocyanate) dissolved in 2.0 parts of p-xylene was added thereto and allowed to react at 75° C. for one hour to form a prepolymer. The prepolymer was dissolved in a mixture of methyl ethyl ketone and toluene to form a diluted prepolymer. Then to all the diluted prepolymer 4.3 parts of the curative solution from Example IV was added. A skin was sprayed on the mold and air cured at 20° C. The clear skin was postcured at 80° C. for two hours and then exposed for 100 hours in the weatherometer with only negligible discoloration.

Similarly, a commercial polybutadiene polyol may be used instead of the hydrogenated polybutadiene polyol except it will be necessary to use 1 to 5 percent of a noncoloring antioxidant suitable for use with the high cis-polyisoprene rubbers to stabilize the ethylenic double bonds.

Also, the polycarbonate polyols such as the reaction product of a phosgenated ethylene glycol with an excess of propylene glycol may be used instead of the polyester polyols or the polyether polyols.

EXAMPLE VII

A decorative skin was prepared using the technique of Example I except the mold halves 4 and 5 had a rectangular polyethylene masking frame placed thereon. The masking frame served to prevent the homogeneous polyurethane from extending from the cavity of the mold halves beyond the nicked area 13 and thus avoid the need to trim the finished cushion.

Then sufficient polyurethane formable mixture was placed in the lower mold part to fill the mold upon its foaming and the lid was closed on the lower half of the mold after the seam area had been wet with the homogeneous polyurethane of Example II. After the polyurethane foamable mixture had foamed and cured, the mold was opened and the finished cushion stripped from the mold.

It should be appreciated that this method permits skin covered foamed articles to be made having many design effects. For instance, the seam area can be made to simulate a sewn seam, or even a rounded one where so desired.

While certain representative embodiments and details have been shown for the purpose of illustrating the invention, it will be apparent to those skilled in this art that various changes and modifications may be made therein without departing from the spirit or scope of the invention.

What is claimed is:

1. A method for producing a cellular article having a cellular core member having a covering of a decorative polyurethane skin joined to give at least one seam comprising providing at least a two-part mold and foaming polyurethane skin members within the mold cavities thereof and which extend out over the lip areas of each mold cavity, wetting the lip portions of the polyurethane skin members with a polyurethane reaction mixture, adding a charge of a foamable polyurethane mixture to the mold, assembling the mold cavities with the polyurethane skin members in overlapping relationship in the lip areas, causing the foamable material to foam and fill the mold, removing the composite cellular article from the mold after the polyurethane reaction mixtures have reacted and cured.

2. The method of claim 1 wherein a spray mask is used to control the extent to which the polyurethane skin members extends out over the lip area.

3. The method of claim 1 wherein any excess material is trimmed away.

References Cited

UNITED STATES PATENTS

| | | | |
|---|---|---|---|
| 2,976,577 | 3/1961 | Gould | 161—161 X |
| 3,258,511 | 6/1966 | McGregor | 264—45 |
| 3,487,134 | 12/1969 | Burr | 264—45 |
| 3,501,564 | 3/1970 | Snoeyenbos et al. | 161—190 X |

FOREIGN PATENTS

| | | | |
|---|---|---|---|
| 873,518 | 7/1961 | Great Britain | 264—45 |
| 664,192 | 6/1963 | Canada | 264—45 |
| 223,805 | 10/1962 | Austria | 264—45 |
| 1,901,828 | 8/1970 | Germany | 264—45 |

PHILIP E. ANDERSON, Primary Examiner

U.S. Cl. X.R.

161—161, 190; 264—54, 161, 261

PO-1050
(5/69)

UNITED STATES PATENT OFFICE
CERTIFICATE OF CORRECTION

Patent No. 3,795,722                    Dated March 5, 1974

Inventor(s) William O. Sassaman

It is certified that error appears in the above-identified patent and that said Letters Patent are hereby corrected as shown below:

Column 3, line 44, change "p-methane diisocyanate" to
-- p-menthane diisocyanate --;

Column 3, line 59, change "p-methane diamine" to
-- p-menthane diamine --;

Column 4, line 18, insert -- for -- after "useful";

Claim 1, line 4, change "foaming" to -- forming --.

Signed and sealed this 29th day of October 1974.

(SEAL)
Attest:

McCOY M. GIBSON JR.                    C. MARSHALL DANN
Attesting Officer                      Commissioner of Patents